United States Patent [19]

Sinclair

[11] Patent Number: 4,491,288

[45] Date of Patent: Jan. 1, 1985

[54] AIRCRAFT LANDING WHEEL ROTATING MEANS

[76] Inventor: Graham R. Sinclair, 18 Marie St., Murarrie, Queensland 4172, Australia

[21] Appl. No.: 503,135

[22] PCT Filed: Aug. 13, 1982

[86] PCT No.: PCT/AU82/00130

§ 371 Date: Jun. 1, 1983

§ 102(e) Date: Jun. 1, 1983

[87] PCT Pub. No.: WO83/01239

PCT Pub. Date: Apr. 14, 1983

[30] Foreign Application Priority Data

Oct. 8, 1981 [AU] Australia ............................ PF1119
Jun. 15, 1982 [AU] Australia ............................ 84861/82

[51] Int. Cl.³ .......................................... B64C 25/40
[52] U.S. Cl. .................................. 244/103 S; 415/3; 290/55
[58] Field of Search ............ 244/103 S, 207, 53 B; 415/2-4; 180/1 FV, 1 P; 296/1 S; 290/43-44, 54-55

[56] References Cited

U.S. PATENT DOCUMENTS

| | | |
|---|---|---|
| 59,828 | 11/1866 | Fay ................................ 415/3 A |
| 415,904 | 11/1889 | Duncan ........................... 415/3 A |
| 2,312,159 | 2/1943 | Gulotta . |
| 2,409,439 | 10/1946 | Law ............................... 415/4 |
| 2,412,884 | 12/1946 | Grabash ......................... 244/103 S |
| 2,424,941 | 7/1947 | Musser et al. . |
| 2,454,627 | 11/1948 | Brandt et al. . |
| 2,466,568 | 4/1949 | Bean . |
| 2,594,202 | 4/1952 | Necchi . |
| 2,665,087 | 1/1954 | Clover . |
| 2,777,651 | 1/1957 | Gates . |
| 3,004,738 | 10/1961 | Peterson . |
| 3,161,377 | 12/1964 | Balluff ............................ 244/207 |
| 4,061,294 | 12/1977 | Hawkins ........................ 244/103 S |
| 4,397,431 | 8/1983 | Ben-Poraf ....................... 244/53 B |

FOREIGN PATENT DOCUMENTS

| | | |
|---|---|---|
| 2109563 | 9/1972 | Fed. Rep. of Germany . |
| 2286952 | 4/1976 | France ........................... 415/3 A |
| 1527880 | 10/1978 | United Kingdom . |

*Primary Examiner*—Galen L. Barefoot
*Attorney, Agent, or Firm*—Schwartz, Jeffery, Schwaab, Mack, Blumenthal & Koch

[57] ABSTRACT

An aircraft landing wheel rotating means has an airscoop (21) mounted on the undercarriage unit (10) between a pair of landing wheels (16) fitted with tires (14). A wheel outlet (25) in each side of the airscoop (21) directs the airflow over turbine blades (20) formed integrally with the landing wheels (16) as spokes interconnecting the rims to the wheel hubs (15) (which incorporate disc breaking systems). The airscoop (21) has a rearward venting outlet (24) which is selectively closed by hinged doors (29) and/or flaps (34) to direct the airflow to the turbine blades (20) or opened to allow a portion of the airflow to bypass the turbine blades (20) and so reduce the drag produced by the airscoop as the undercarriage unit (10) is lowered prior to landing or on take-off.

12 Claims, 3 Drawing Figures

AIRCRAFT LANDING WHEEL ROTATING MEANS

BACKGROUND OF THE INVENTION

1. Field of the Invention

This invention relates to aircraft landing wheel rotating means.

2. Brief Description of the Prior Art

When an aircraft lands, the tires on the landing wheels receive a large jolt as they are substantially stationary prior to touchdown and then they are suddenly accelerated to approximately the speed of the aircraft in a few seconds after touchdown. This jolt leads to rapid wear of the tires and often results in "flat spots" which unbalance the tires and may lead to blowouts. As the landing speeds of aircraft increase, the problem of tire wear is exacerbated.

Many methods have been proposed to rotate the landing wheels prior to touchdown to reduce the relative speed between the tires and the runway. Examples of these methods are disclosed in U.S. Pat. Nos. 2,313,159 (Gulotta); 2,466,568 (Bean); 2,594,202 (Necchi); 2,665,087 (Clover); 2,777,651 (Gates) and 3,004,738 (Peterson).

Generally these methods rely on the use of an airscoop which directs air under pressure onto a series of turbine blades attached to the landing wheels so that the flow of air over the blades rotates the wheels.

These methods have proved unsatisfactory. The airscoops create considerable unwanted drag, both when the undercarriage is lowered prior to touchdown and when the aircraft takes off, and because they must withstand large air forces, they are heavy, reducing the aircraft payload and increasing the fuel consumption.

BRIEF SUMMARY OF THE PRESENT INVENTION

It is an object of the present invention to provide a means to rotate the landing wheels prior to touchdown but with little, if any, drag as the undercarriage is lowered or on take off.

It is a preferred object to provide a means which incorporate a lightweight airscoop which directs the air to the landing wheels.

It is a further preferred object that the turbine blades form the spokes of the landing wheels.

It is a still further preferred object that the airscoop will direct a large volume of air in and around the disc braking system to improve its efficiency.

Other preferred objects will become apparent from the following description.

In one aspect the present invention resides in an aircraft landing wheel rotating means including:

a landing wheel rotatably mounted on an undercarriage leg;

a plurality of turbine blades, attached to, or formed integrally with, the landing wheel; and an airscoop mounted on the undercarriage leg adjacent the landing wheel, the airscoop having a forwardly directed inlet and a wheel outlet adapted to direct the airflow through the airscoop to the turbine blades to rotate the landing wheel, the airscoop being characterized by:

a rearwardly directing venting outlet; and movable means operable to selectively close the venting outlet to direct the airflow through the wheel outlet to the turbine blades and open the venting outlet to allow at least a portion of the airflow to pass through the venting outlet and bypass the turbine blades.

Preferably the undercarriage leg has an axle, and the landing wheel has a hub rotatably mounted on the axle, the turbine blades interconnecting the hub and rim of the landing wheel. Preferably the disc braking system for the wheel is incorporated in the hub.

Preferably the airscoop has a lightweight sheet metal housing with a preferably rectangular inlet and venting outlet. Preferably the wheel outlet is formed in the side of the housing adjacent the landing wheel and has a substantially frusto-conical shape complementary to the frusto-conical inner rim section of the landing wheel rim. Preferably the wheel outlet lies within the inner rim section and a minimal clearance is provided between the two to limit the escape of air between the airscoop and the landing wheel.

Preferably the movable means includes one or more doors and/or flaps pivotally or hingedly mounted in the housing rearwardly of the wheel outlet and operable to close the venting outlet. The doors or flaps may be opened and closed by hydraulic rams connected to the doors or flaps by links or cranks. Alternatively, the shafts supporting the doors or flaps may be fitted with gears engaged with racks or worms movable by hydraulic rams or servomotors.

Preferably the doors, when closing the venting outlet, engage the upright leg of the undercarriage leg and their leading edges may be concealed behind a fairing provided forwardly of the leg in the housing.

BRIEF DESCRIPTION OF THE DRAWINGS

To enable the invention to be fully understood, a number of preferred embodiments will now be described with reference to the accompanying drawings, in which.

DETAILED DESCRIPTION OF THE PREFERRED EMBODIMENTS

Figure 1:
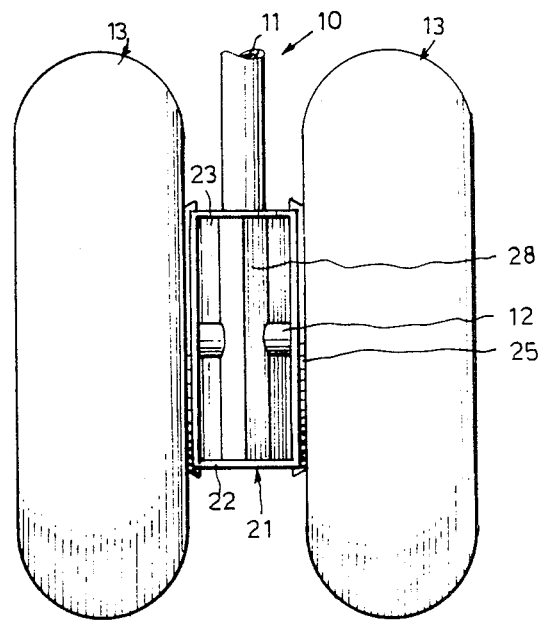
FIG. 1 is front view of a first embodiment.
Figure 2:
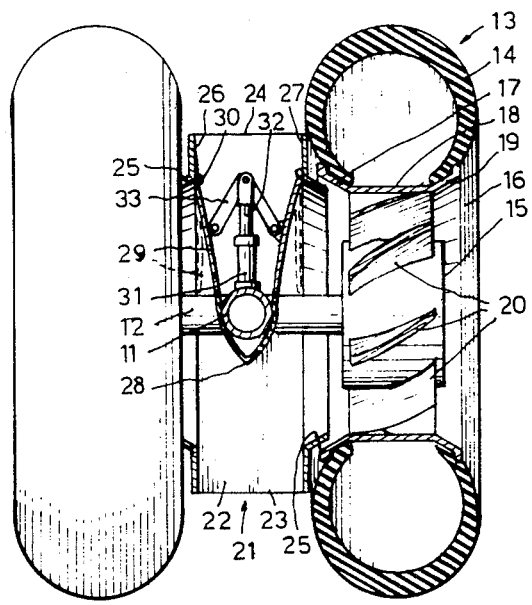
FIG. 2 is a part-sectional plan view of the embodiment of FIG. 1.

Referring to FIGS. 1 and 2, the aircraft undercarriage unit 10 has a substantially upright leg 11 extending downwardly from a telescopic suspension unit (not shown) and a pair of stub axles 12 extending transversely from the base of the leg.

A pair of landing wheel assemblies 13, fitted with pneumatic tires 14, have their hubs 15 (which incorporate disc brake assemblies) mounted on the axles 12. Each wheel has a rim 16 with an inwardly convergent substantially frusto-conical inner rim section 17, a cylindrical central well section 18 and an inwardly convergent outer rim section 19.

A plurality of curved, angularly inclined, turbine blades 20 are integrally cast with the hub 15 and rim 16 at even spacings to act as spokes interconnecting the hub and rim.

The airscoop 21 is mounted on the undercarriage unit 10 intermediate of the landing wheel assemblies 13 and has a sheet metal housing 22 with a substantially rectangular inlet 23 directed forwardly and a similar venting outlet 24 directed rearwardly.

Figure 3:
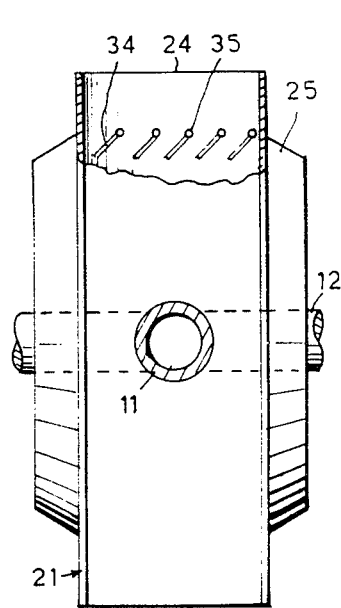
FIG. 3 is a part-sectional plan view of a second embodiment.

A wheel outlet 25 is provided in each side wall 26 of the housing coaxially with its adjacent landing wheel assembly 13. As shown in FIG. 3, the wheel outlets 25 are substantially frusto conical in shape, being outwardly convergent and complementary to the inner rim section 17 of their adjacent landing wheels 16. The wheel outlets 25 extend to be within the inner rim sections and the minimal running clearance 27 between them limits the escape of air between the airscoop and the landing wheel assemblies. As shown in FIG. 2, the wheel outlets 25 direct the airflow (under pressure) from the inlet 23 to the turbine blades 20 to rotate the landing wheel assemblies 13.

A substantially vertical tapered fairing 28 is provided in the housing 22 and its wings extend to each side of the undercarriage leg 11 to divide the air-flow entering the airscoop into two separate paths.

A pair of doors 29 are pivotally mounted on shafts 30 adjacent the side walls 26 and rearwardly of the wheel outlets 25. A hydraulic ram 31 is mounted on the rear of the undercarriage leg 11 and the free end of its piston rod 32 is connected to the doors 29 by links 33. When the ram 31 is extended, the doors 29 are swung inwardly to close the venting outlet 24 and so direct the airflow to the wheel outlets 25 to cause the landing wheel assemblies to be rotated. (The leading edges of the doors 29 are rested behind the wings of the fairing 28 to smoothly direct the airflow to the wheel outlets 25.)

When the ram 31 is retracted, the doors 29 are swung to the open position (shown in dashed lines) opening the venting outlet 24 and partially closing the wheel outlets 25 to enable most of the airflow to pass from the inlet 23 to the venting outlet 24 with minimal destruction (and minimal drag). On take-off, and when the undercarriage units 10 are lowered prior to landing, the doors 29 are opened and the airscoop 21 generates little drag. The ram 31, operated by a computer (not shown) is progressively extended to close the doors 29 and so direct all the airflow over the turbine blades 20 to rotate the landing wheel assemblies. (When the doors are open, a portion of the airflow will be directed through the wheel outlets 25 and so the airflow will begin to rotate the landing wheel assemblies before the doors are closed).

As the drag due to the airscoop 21 is progressively increased as the doors are closed, any changes in altitude of the aircraft due to the increase drag will only occur slowly and can be easily compensated by the pilot on the control surface computer. The computer controlling the ram 31 (and the operation of the doors) can be linked to the airspeed indicator so that the doors will not be closed above a preset airspeed e.g. 320 km/hr. where the air pressure on the airscoop would damage the doors and the other components.

In the second embodiment shown in FIG. 3, the doors 29 are replaced by a series of hinged flaps 34, mounted on shafts 35 journalled in the top and bottom walls of the housing 22, forward of the venting outlet 24. A gear (not shown) is provided at one end of each of the shafts 35 and the gears engage a worm driven by a servomotor or a rack connected to a hydraulic ram to open and close the flaps. As the flaps 34 are offset on the shafts 35, the air pressure in the airscoop will assist in moving them to the closed position.

It certain applications, the airscoop will be provided with both the doors 29 and flaps 34 to ensure effective sealing of the venting outlet 24. In addition, seals may be provided around the lip of the wheel outlets 25 to engage the inner rim sections 17 to sealably close the clearance 27.

Because the airscoop can be manufactured from lightweight metal sheet, its weight can be kept to a minimum and so the incorporation of the invention will have minimal effects on the payload and fuel consumption of the aircraft. In addition, the airflow directed over the disc braking system in the wheel hubs 15 will improve the efficiency of the braking systems.

The embodiments described and illustrated provide simple but effective means for rotating the landing wheels prior to touchdown to so reduce tire wear.

Various changes and modifications may be made to these embodiments without departing from the present invention.

I claim:

1. An aircraft landing wheel rotating means including:
    a landing wheel (13) rotatably mounted on an undercarriage leg (11); said landing wheel (13) having a plurality of turbine blades (20); and
    an airscoop (21) mounted on the undercarriage leg (11) adjacent the landing wheel (13), the airscoop (21) having a forwardly directed inlet (23) and a wheel outlet (25) adapted to direct the airflow through the airscoop (21) to the turbine blades (20) to rotate the landing wheel (13), the airscoop (21) being characterized by:
    a rearwardly directed venting outlet (24); and
    movable means (29,34) operable to selectively close the venting outlet (24) to direct the airflow through the wheel outlet (25) to the turbine blades (20) and open the venting outlet (24) to at least a portion of the airflow to pass through the venting outlet (24) and bypass the turbine blades (20).

2. A wheel rotating means as claimed in claim 1 wherein:
    the undercarriage (10) includes an axle (12) on the leg (11);
    the landing wheel (13) has a hub (15) rotatably mounted on the axle (12) and a rim (16) mounting a tire (24); and
    the turbine blades (20) are formed integrally with the landing wheel (13) as spokes interconnecting the hub (15) and the rim (16).

3. A wheel rotating means as claimed in claim 2 wherein:
    the rim (16) has a substantially inwardly convergent frusto-conical inner rim section (17) and a substantially cylindrical central wall section (18), the turbine blades (20) interconnecting the central wall section (18) to the hub (15); and
    the airstoop (21) has a housing (22) where the wheel outlet (25) is provided in the side of the housing (22) adjacent the landing wheel (13) and is coaxial therewith, the wheel outlet (25) having a substantially outwardly convergent frusto-conical shape complementary to the inner rim portion (17) and the wheel outlet (25) lying within the inner rim portion (17) to limit the escape of air between the airscoop (21) and the landing wheel (13).

4. A wheel rotating means as claimed in claim 1 wherein:
    the movable means (29,34) includes at least one door (29) or flap (34) hingedly mounted on a shaft (30, 35) in a housing (22) of the airscoop (21) rearwardly of the wheel outlet (25); and operating means (31) are provided to move the doors (29) or flaps (34) between the closed and opened positions.

5. A wheel rotating means as claimed in claim 4 wherein:
the operating means (31) includes a hydraulic ram (31) mounted on the undercarriage leg (11) connected to the door(s) (29) by a pivotal link or links (33).

6. A wheel rotating means as claimed in claim 4 wherein:
the operating means includes a gear on the shaft (s) (30,35) in engagement with a worm rotated by a servomotor.

7. A wheel rotating means as claimed in claim 4 wherein:
one door 29 is urged towards the closed position by the air pressure in the housing (22).

8. A wheel rotating means as claimed in claim 4 wherein:
a fairing (28) having rearwardly divergent wings is provided in the housing (22) forwardly of the door(s) (29) and the leading edges of the door(s) (29) are nested behind the wings of the fairing (28).

9. A wheel rotating means as claimed in claim 1 wherein:
a plurality of landing wheels (13) are provided on each undercarriage unit (10) in at least one side-by-side pair; and
a respective wheel outlet (25) is provided in the airstoop for each landing wheel (13).

10. A wheel rotating means as claimed in claim 4 wherein: the operating means includes a gear on the shaft (s) (30, 35) in engagement with a rack moved by a hydraulic ram.

11. A wheel rotating means as claimed in claim 4 wherein: at least one flap (34) is urged towards the closed position by the air pressure in the housing (22).

12. An aircraft landing wheel rotating means including:
a plurality of landing wheels (13) rotatably mounted on an undercarriage leg (11) in at least one side-by-side pair;
each of said landing wheels (13) having a plurality of turbine blades (20); and
an airscoop (21) mounted on the undercarriage leg (11) adjacent the landing wheels (13), the airscoop (21) having a forwardly directed inlet (23) and a wheel outlet (25) for each landing wheel adapted to direct the airflow through the airscoop (21) to the turbine blades (20) to rotate the landing wheels (13), the airscoop (21) being characterized by:
a rearwardly directed venting outlet (24); and
movable means (29, 34) operable to selectively close the venting outlet (24) to direct the airflow through the wheel outlets (25) to the turbine blades (20) and open the venting outlet (24) to at least a portion of the airflow to pass through the venting outlet (24) and bypass the turbine blades (20).

* * * * *